United States Patent [19]

Katerberg et al.

[11] Patent Number: 4,878,064

[45] Date of Patent: Oct. 31, 1989

[54] CONTINUOUS INK JET STIMULATION ADJUSTMENT BASED ON OVERDRIVE DETECTION

[75] Inventors: James A. Katerberg, Kettering; Robert L. Wint, Trottwood; Richard A. Lewis, Miamsburg, all of Ohio

[73] Assignee: Eastman Kodak Company, Rochester, N.Y.

[21] Appl. No.: 264,738

[22] Filed: Oct. 31, 1988

[51] Int. Cl.[4] .............................................. G01D 18/00

[52] U.S. Cl. ........................................ 346/75; 346/1.1

[58] Field of Search .................................. 346/75, 1.1

[56] References Cited

U.S. PATENT DOCUMENTS 4,691,829 9/1987 Auer .................................... 209/3.1

OTHER PUBLICATIONS

Gregory Ream, Servo Control of Multinozzle Ink-Jet Operating Point, Mar./Apr. 1984, IEEE Transactions on Industry Appln's, vol. IA, No. 2, pp. 282-288.

*Primary Examiner*—Clifford C. Shaw
*Assistant Examiner*—Gerald E. Preston
*Attorney, Agent, or Firm*—John D. Husser

[57] ABSTRACT

A system for adjusting the stimulation amplitude of a continuous ink jet printer to operate in a satellite-free, drop break off region includes a test charge electrode located downstream from the nominal information charging zone, an electrometer for detecting drop charge imported by the test charge electrode and a control circuit for gradually varying stimulation between the underdrive to overdrive regions. An information storage and processing system stores and computes the stimulation amplitude corresponding to the overdrive inception point during such stimulation ramping and a nominal operating stimulation amplitude is selected based on the computed inception point stimulation.

8 Claims, 4 Drawing Sheets

CONTINUOUS INK JET STIMULATION ADJUSTMENT BASED ON OVERDRIVE DETECTION

FIELD OF THE INVENTION

The present invention relates to continuous ink jet printing methods and apparatus and more particularly to systems and procedures for controlling the stimulation amplitude of ink jet streams to improve such printing.

BACKGROUND OF INVENTION

In continuous ink jet printing, streams are discharged from an orifice or array of orifices to form droplet streams. To regulate the streams' breakup into uniformly sized and spaced drops, series of energy pulses of predetermined frequency are applied to the ink stream. One preferred mode for applying the pulse series that stimulate uniform droplet streams is by vibration, e.g., of the orifice plate, a resonator housing or the ink volume behind the orifices. When the issuing ink streams (called filaments) break up properly into droplet streams, the filament tip separates into a droplet within a predetermined drop charge region, e.g., adjacent a charge electrode. The charge electrode is energized with a charge voltage, or is not so energized, in accord with an information signal; and because the ink is conductive and grounded, a charge is correspondingly induced, or not induced, on the drop then forming at the drop charge region. Ink droplets are thereafter passed to the print zone, or are caught, in accord with their charged or non-charged conditions.

It will be appreciated from the foregoing that it is important, for good printing operations, to assure the ink filaments break up into drops within the nominal charging region (i.e. within a given range of locations along the drop path that is acceptably close to the charge electrode). Drop breakup before or beyond this nominal charging region can result in improper drop charging.

Another important factor for obtaining reliable printing is that the stimulating energy be applied in a manner that avoids formation of small satellite drops during the occurrences of filament break off. This is because it is difficult to control drop charging and deflection in the presence of such satellite drops. It has been recognized, e.g, see U.S. Pat. No. 4,631,549, that as the amplitude of drop-stimulating energy increases, the drop break off conditions change from an "underdrive" stimulation region where satellites (both of the merging and infinite type) are formed to a satellite-free region where no satellites are formed to an "overdrive" condition where satellites are again formed. There is a direct relation between filament length (i.e. the length from orifice to drop break off point) and the domains of satellite and non-satellite drop formation, and it is desired to operate at a stimulation amplitude that achieves both the proper break off point location and the desired non-satellite domain of drop formation. However, in addition to dependence on stimulation energy amplitudes, the domains where satellite and non-satellite drop formation occur depend on other system parameters (e.g., temperature, ink viscosity and ink pressure). Those other parameters can vary gradually over periods of time, and prior art techniques have been developed to periodically check and adjust the stimulation amplitude, in view of such variations, to assure optimum drop charging and deflection.

In the procedure taught by U.S. Pat. No. 4,631,549, the operating stimulation amplitude is obtained by detecting the stimulation amplitude at the infinite satellite condition (with an electrometer) and selecting the operating amplitude to be a value that is a predetermined multiple of the detected infinite satellite stimulation amplitude. However, the infinite satellite detection and adjustment approach is sometimes hard to effect, e.g., when satellites are smaller than normal due to lower ink pressures. Also, the optimum operating point amplitude sometimes varies relative to the infinite satellite amplitude from a fixed predetermined multiple value, depending, e.g., on temperature, pressure, orifice size and ink properties.

U.S. Pat. No. 4,638,325 describes a procedure for assessing ink jet filament lengths in order to select an appropriate operating stimulation amplitude. This procedure employs a narrow test charge electrode located at the information charge electrode position (or directly opposite that position across the drop path). As stimulation amplitude is increased from a lower amplitude range to higher amplitudes, the filament length gradually shortens. The small charge imparted to ink drops by the test charge electrode gradually increases as the filament break off point moves upwardly toward the test charge electrode, and then begins to decrease as the stimulation passes into the overdrive region and the filament again begins to lengthen. The charges imparted to ink drops are measured at the various stimulation amplitude stages by an electrometer and the stage of maximum imparted charge is identified as the minimum filament length, and thus the overdrive inception point. A desired operating amplitude for stimulation is then selected.

The '325 patent procedure is very useful, but it requires that the test charge electrode be precisely located vis-a-vis the minimum filament length of the printing system. Otherwise, a filament can continue to shorten, above the test charge electrode and be mistaken for a filament increasing in length below the test charge electrode. Also, locating a test charge electrode at or opposite the information drop charge site presents construction difficulties.

SUMMARY OF THE INVENTION

One significant purpose of the present invention is to provide improved apparatus and methods for detecting and adjusting the stimulation amplitude of continuous ink jet printer systems for reliable operation in a satellite-free stimulation region. The present invention provides the advantage of more assuredly detecting a known base point condition for adjustment. The base point detected in accord with the invention has a stable adjustment relationship with the preferred nominal operating point. Another important advantage is that the present invention minimizes the criticality of precise location for the test charge electrode, vis-a-vis the orifice plate of the printing system. The present invention also obviates test electrode obstructions at the information charge site. In addition, the present invention can be implemented in modes where the test charge electrode will function to provide improved deflection during printing.

In one preferred aspect the present invention constitutes an improved stimulation control system for a continuous ink jet printer of the kind which directs ink jet filaments toward a print zone and stimulates the filaments with energy pulses of predetermined frequency to effect drop stream formation. The system includes: (i) a test charge electrode located along the droplet path between the underdrive and overdrive inception point region of filament length and (ii) a drop charge detector located downstream from the test charge electrode, for cooperatively detecting a base stimulation amplitude that causes the minimum-filament-length condition. The system also includes control means, responsive to such detection, for adjusting stimulation to a nominal operating amplitude that is a predetermined fraction of the detected base stimulation amplitude.

In other aspects the present invention constitutes preferred methods and structures whereby a common electrode structure can function both for stimulation adjustment during test modes and for improved "catch drop" deflection during printing modes.

BRIEF DESCRIPTION OF THE DRAWINGS

The subsequent description of preferred embodiments of the invention refers to the accompanying drawings wherein.

DETAILED DESCRIPTION OF THE PREFERRED EMBODIMENTS

Figure 1:
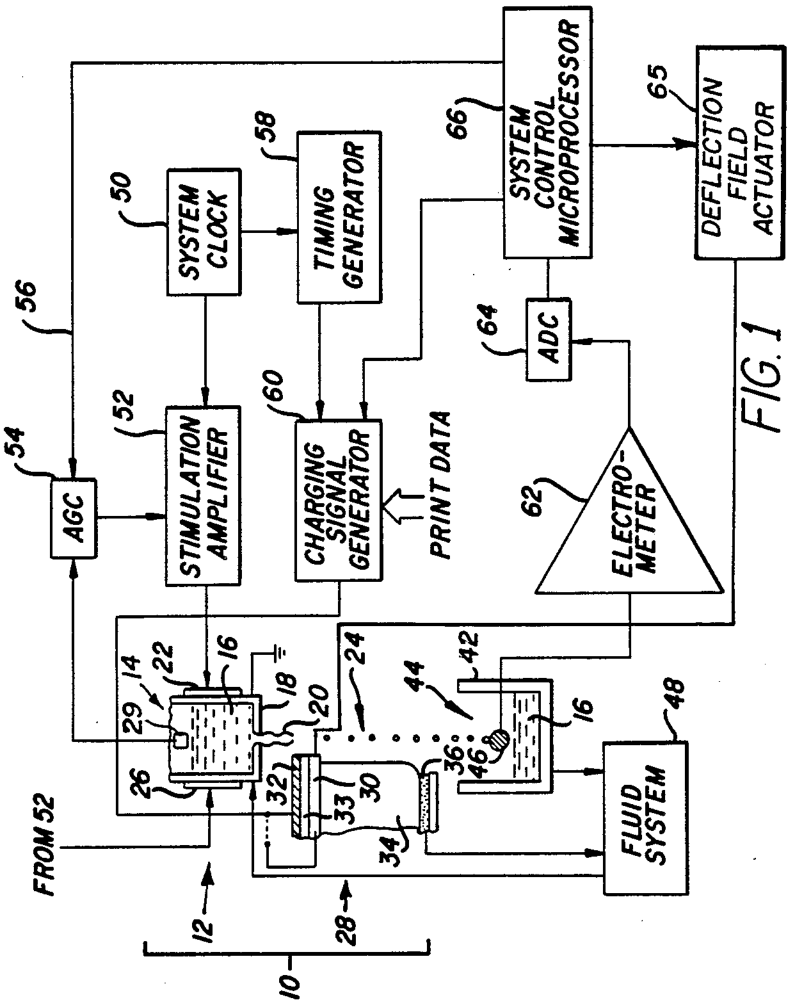
FIG. 1 is a schematic diagram showing one preferred printer and stimulation adjustment system in accord with the present invention.

Referring to FIG. 1, a continuous binary ink jet printing head is shown schematically along with associated electronics for practicing a preferred mode of the present invention. The upper print head 12 can be of the type shown in U.S. Pat. No. 4,646,104 and includes means defining an ink reservoir 14 containing conductive ink 16 under pressure. The pressurized ink is forced through an orifice plate 18 to produce an ink filament(s) 20. The upper print head also includes piezoelectric transducers 22, 26, coupled to a resonant body of the upper head portion 12, for inducing mechanical vibrations in the orifice plate that stimulate filament breakup into drop streams 24. A piezoelectric feedback transducer 29 on the resonant body measures the amplitude of stimulation imparted to the upper head portion 12 by the transducers 22, 26.

The ink jet printing head 10 also includes a lower portion 28 having an information drop charge electrode 32 arranged adjacent the ink jet filament 20 for selectively inducing charge, in accord with print data, on the ink drops 24 as they separate from the ink filament 20. During printing, charged drops are deflected into the face of a drop catcher 34 where they are collected into an ink gutter 36 comprising a slot at the bottom of the drop catcher 34. In accord with this preferred embodiment of the present invention, the lower print head portion also includes an insulator member 33 and a test charge electrode 30 which will be described further hereafter.

A home station 42 is provided at a storage and startup location within the ink jet printer, and in test modes the ink jet printing head 10 is positioned over the home station. The home station includes an ink sump 44 for receiving ink drops from the ink jet print head that are not sufficiently charged to be deflected onto the drop catcher 34. An electrometer electrode 46 is located in the home station in a position to receive the electrical charge carried by the ink drops entering the home station. Exemplary preferred constructions for the electrometer system of such home station are disclosed in U.S. Pat. No. 4,591,874.

A fluid system 48, hydraulically connected to the print head 10 and home station 42, supplies the conductive ink, under pressure, to ink reservoir 14 in the upper head portion 12 of the printing head, and recirculates the ink from the catcher 34 and the sump 44.

The ink jet printer electronics includes a system clock 50 that supplies a periodic clock signal (e.g., about 75 KHz) to a stimulation signal amplifier 52. The output of the stimulation amplifier 52 is applied to the piezoelectric transducers 22, 26. The gain of the stimulation amplifier, and hence the amplitude of the stimulation signal is controlled by an automatic gain control servo 54. The automatic gain control servo 54 receives a reference level signal on line 56, and a feedback signal from feedback transducer 29, and controls the gain of the stimulation amplifier such that the feedback signal matches the reference signal.

The clock signal from the system clock 50 is also connected to a timing generator 58 that produces timing pulses that determine the phase of the printing pulses that are applied to information charging electrode 32. The timing pulses are applied to a charging signal generator 60 that can receive a digital print data signal, during the printing mode to generate the printing pulses for the charging electrode 32. A system control microprocessor 65 is programmed to actuate the generator 60 to provide test charge signals to electrode 30 during test modes and to actuate deflection field actuator circuit 65 to provide a constant D.C. voltage to electrode 30 during print operations.

An electrometer 62 is connected to the electrometer electrode 46, and generates an analog signal that is proportional to the ink jet current incident on the electrometer electrode 46. The analog output signal of the electrometer is supplied to an analog to digital converter 64 to produce a digital signal indicative of the ink jet current sensed by the electrometer 62.

The system control microprocessor 66 receives the digital ink jet current signal from the electrometer 62 and also is programmed as described below, to effect a stimulation amplitude adjustment sequence, to store the detected data representative of outputs from electrometer 62 during that sequence, to compute a preferred operating stimulation amplitude based thereon, and to control the gain of the stimulation amplifier 52 by providing a reference signal to automatic gain control circuit 54 on line 56.

Before describing a detail operating procedures of the present invention, a brief additional explanation of the various filament stimulation conditions will be helpful. Thus, the natural filament length of an unstimulated ink jet is relatively long, and the drop separation is not well behaved. As the stimulation amplitude is increased, the filament gets shorter. Eventually, the "slow satellite" region is reached where small droplets occur at break off and travel slower than the main drops, hence are quickly overtaken and assumed into the main drops. As the stimulation amplitude is further increased, the speed of the satellites increased until a region is reached wherein the speed of the satellite droplets equals the speed of the main ink drops, and the satellite droplets remain separate from the main drops. This is called the "infinite satellite" region. A further increase in stimulation amplitude produces fast satellites (droplets that travel faster than the main drops, and hence overtake and are assumed by the main drops). It should be noted that the boundaries of these regions are not clearly defined and that the general locations of the regions of satellite production are a function of ink temperature, pressure, viscosity and surface tension. Collectively these regions are referred to herein as the underdrive region.

As the stimulation amplitude is further increased, a region of satellite-free drop production is encountered. This region is the desirable range for printing operation of the ink jet print head. At some still higher stimulation amplitude, herein referred to as the "overdrive inception point", the ink jet filament reaches a minimum, and then begins to lengthen again. In this overdrive region of again-increasing filament length condition, satellites may also be produced, but their production is extremely unpredictable.

Figure 2C:
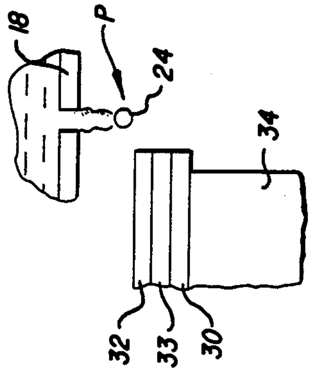
FIGS. 2A-2C are enlarged schematic views of the FIG. 1 print head illustrating different stimulation conditions and showing one preferred structure for implementing testing and information drop charging in accord with the present invention.
Figure 2B:
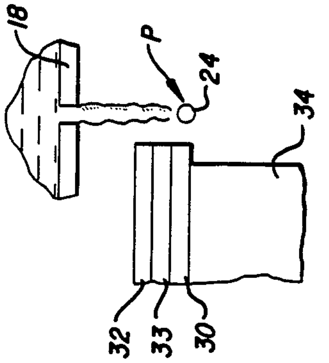
Figure 2A:
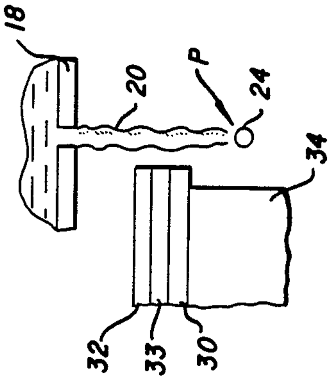

The function of the FIG. 1 embodiment of the present invention can be understood further by referring now to FIGS. 2A–2C. In those Figures the length of filament 20 (from orifice plate 18 to the drop break off point P) can be seen to progressively shorten as the stimulation amplitude is increased. Thus FIG. 2A corresponds to an underdrive stimulation amplitude condition wherein drop separation is not well behaved. As the stimulation amplitude is increased, the filament shortens toward the amplitude conditions represented by FIG. 2B wherein the drop break off conditions pass through the slow satellite and infinite satellite stages to the fast satellite stage. Further increase in stimulation amplitude further shortens the filament and it passes through the desired, satellite-free condition to the minimum filament length (i.e. overdrive inception point amplitude) represented schematically in FIG. 2C. Further increase in stimulation amplitude causes the filament to commence lengthening from the condition shown in FIG. 2C. It will be noted that in accord with this embodiment of the invention the test charge electrode is located well downstream, along the filament path, from the overdrive inception point (i.e. the minimum filament length break off point P shown in FIG. 2C). Further, the test electrode 30 is located downstream of the region of the desired filament length (i.e. downstream of the region of the satellite-free break off, opposite information charge electrode 32). However, the test electrode 30 is located upstream from the underdrive region of filament break off, as represented in FIG. 2A.

Figure 3:
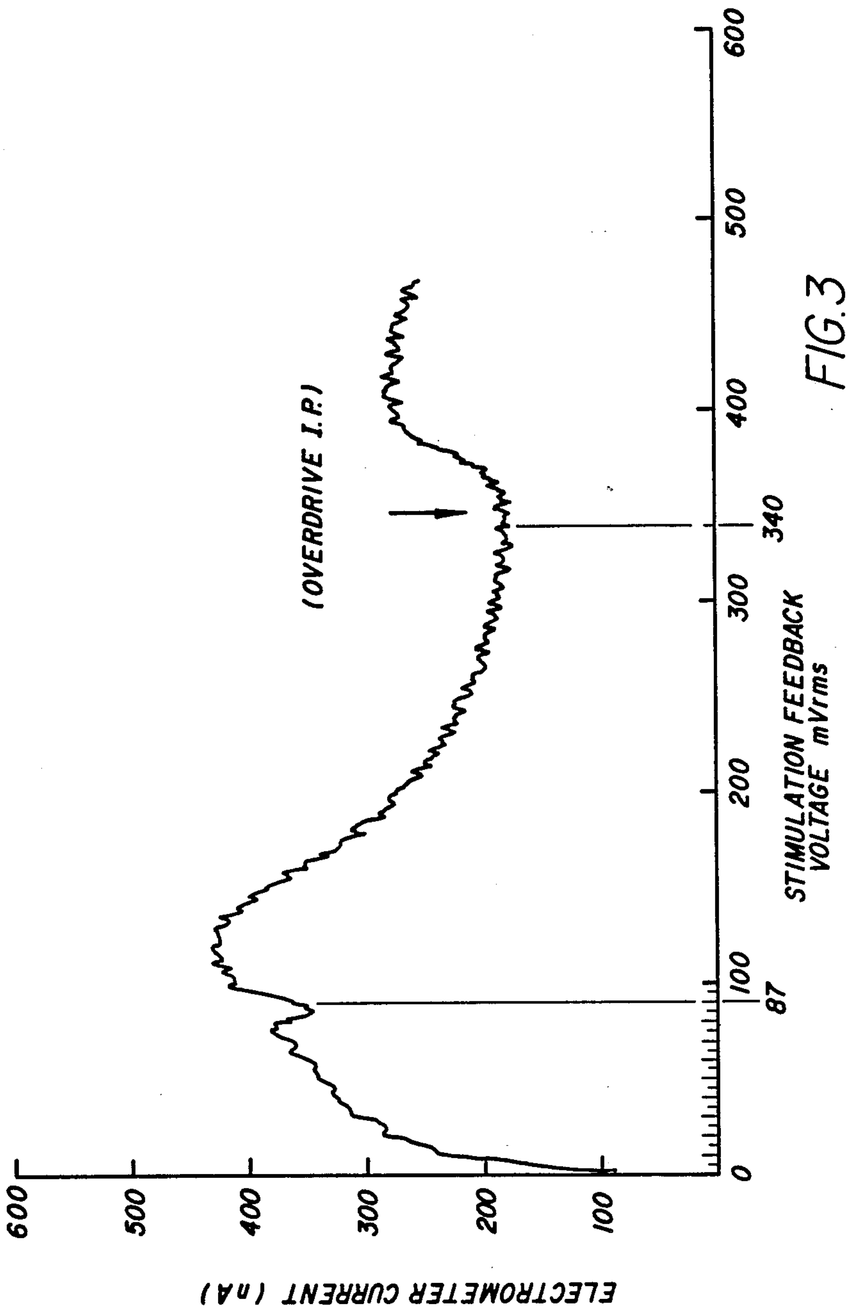
FIG. 3 is a graph showing detected drop charge current versus stimulation feedback voltage as provided in accord with one preferred mode of the present invention.

Considering the graph shown in FIG. 3, a test procedure in accord with the present invention can be described. FIG. 3 shows a plot of stimulation amplitude (as reflected by the resonator feedback voltage) versus drop charge (as reflected by the current from electrometer 62) when a relatively low D.C. voltage is applied to the test charge electrode 30 and a stimulation signal of about 75 KHz (applied via amplifier 52 to the transducer elements 22, 26) is gradually increased and detected by feedback tab 29. Thus the voltage along the abscissa of the FIG. 3 graph is proportional to the stimulating signal amplitude and the ordinate of the FIG. 3 graph is proportional to the charge carried by drops passing from the filament break off point to the electrometer. It can be seen in FIG. 3 that when the stimulation amplitude is in the long filament range of conditions represented by FIG. 2A (corresponding to a feedback signal in the 0–30 mV range), only a small charge is imparted to drops (due to the far distance of the breakup point P below the test electrode 30). As the amplitude of the stimulation signal from amplifier 52 increases (reflected by an in increase in feedback tab signal in the 30–140 mV range) the filament shortens (through the range of conditions represented by FIG. 2B) where the break off point P is opposite test charge electrode 30 and maximum charge is imparted to drops (and reflected as electrometer current). The slight dip in electrometer current to the left of the curve top (about 87mV) corresponds to the infinite satellite condition described in U.S. Pat. No. 4,631,549, where infinite satellite drops are deflected to the catcher due to their high charge to mass ratio.

As the amplitude of the stimulation signal is further increased, the filament break off point moves well above the location directly opposite electrode 30 and the electrometer charge beings to decrease as shown on the FIG. 3 graph. When the stimulation amplitude reaches a point such that the filament length has reached its minimum length, the overdrive inception point (I.P.) condition, shown in FIG. 2C, the voltage from the electrometer reaches an inflection point, because this is the maximum distance of the filament break off point P on the upstream side of electrode 30. This can be seen to occur with a tab feedback voltage of about 340 mV in the graph of FIG. 3. Further signal amplitude causes the filament length to increase, moving it closer to the electrode 30, and increased electrometer current is reflected in the FIG. 3 graph.

We have found that by detecting the overdrive inception point region of minimum electrometer charge (after the filament is driven over the amplitude of maximum charge) of a curve such as FIG. 3, a reliable operational stimulation amplitude can be computed. This mode of selecting the operational stimulation amplitude will assure operation well within a satellite-free drop formation range and locate the drop breakup point approximately opposite information charge electrode.

Figure 4:
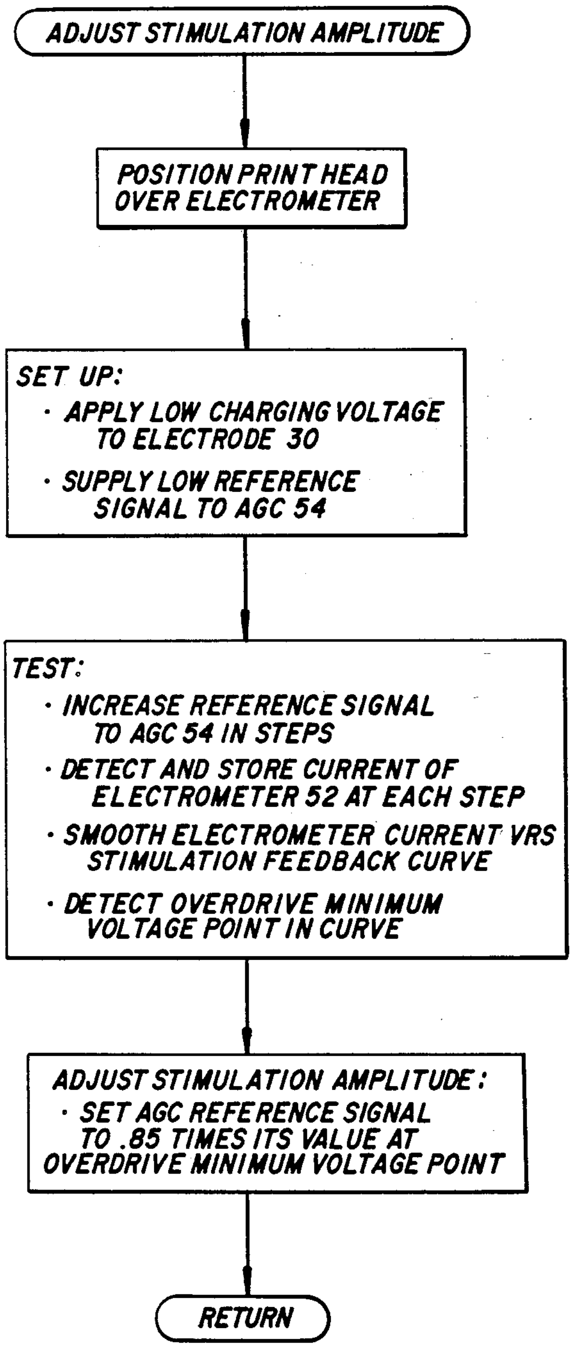
FIG. 4 is a flow chart illustrating one preferred routine for stimulation amplitude adjustment in accord with the present invention.

FIG. 4 illustrates, in block diagram, one preferred control procedure effected by microprocessor 66 to test and set the stimulation signal amplitude in accord with the embodiment described with respect to FIGS. 1 and 2A–2C. Thus, the print head 10 is traversed to a location over the home station 42. A low level D.C. signal is continuously applied to test electrode 30 and a low reference signal is applied to automatic gain control 54. This causes low amplitude stimulation, corresponding to the FIG. 2A filament length. The microprocessor 66 thereafter controls successive incremental increases in the reference signal 54 and stores (e.g. in a RAM device) the data corresponding to voltage levels detected from electrometer 62. The microprocessor (via a ROM program) then smooths the stimulation amplitude versus drop charge curve and detects where, after the curve peak (FIG. 2B condition), the point of minimum charge level occurs. This is the overdrive inception point (FIG. 2C condition). The microprocessor then sets the AGC reference signal to a value which is a predetermined fraction of its value at the overdrive inception point.

In one preferred algorithm for computing the overdrive inception point, the drop charge versus stimulation amplitude data, after the curve peak, is smoothed with a 5 point moving average, used twice. Then the data is searched for the minimum. We have found that an operating point set at 0.85 of the so determined overdrive inception point stimulation amplitude provides highly reliable charge and deflection. In a preferred embodiment of the FIG. 1 system, the information charge electrode 32 extends about 1–2 drop spacings (e.g. about 4–8 mils) along the drop path, the test charge electrode 30 extends about 2 to 3 drop spacings (e.g. about 4–12 mils) along the drop path and the spacer 33 extends about 1 drop spacing or less (e.g. 4 mil or less) along the drop path. The top of charge electrode 32 is located about 7 mils from the orifice plate and its face is about 2.5 mils from the center of the ink filament.

The print head 10 can now be shifted into a printing operation mode. In accord with the FIG. 1 embodiment just described, the test charge electrode 30 now functions as a drop deflection electrode. That is, microprocessor 66 then signals circuit 65 to provide an increased voltage, e.g. of the same magnitude as the information charge voltage to electrode 30. In this mode, described in detail in concurrently filed U.S. application Ser. No. entitled "Improved Constructions and Fabrication Methods for Drop Charge/Deflection in Continuous Ink Jet Printer", the proximity of the electrode 30 to the orifice plate 18 and drop break off point enables highly effective deflection fields at reduced deflection electrode voltage levels.

Figure 5:
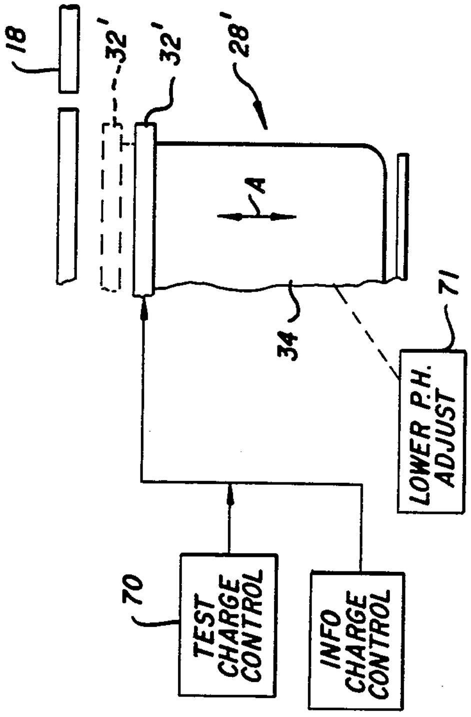
FIG. 5 is a schematic cross-sectional view of another embodiment of print head structure for practice of the present invention.

FIG. 5 illustrates an embodiment of the present invention which does not use separate information charging and test charging electrodes. In this embodiment the lower print head assembly 28' is movable relative to orifice plate 18 in the directions indicated by arrows A, between the solid and dotted line positions shown in FIG. 5. To practice amplitude adjustment in accord with the invention, the lower print head is indexed to the lower solid line position and the printer actuates test charge control subsystem 70 to apply a low magnitude D.C. voltage to charge electrode 32' in the same manner as described with respect to electrode 30 of FIG. 1. The printer system then performs the test routine described with respect to FIGS. 1 and 4 and an operative stimulation amplitude is calculated and stored for printing operations. Electromechanical print head adjustment system 71 (e.g. a solenoid operated mechanism) is then actuated to move the lower print head to the upper, dotted line position shown in FIG. 5. Information charge control subsystem 72 is then actuated to apply higher voltage charge selectively to the electrodes of charge plate 32' in accord with print data. It will be appreciated that the distance which electrode 32' is shifted can be the same as the space between electrodes 30 and 32 in the FIG. 1 embodiment. Also, it will be understood that the changing of orifice plate to charge electrode spacing, between test and printing operations, can be attained by raising and lowering the upper print head portion (including orifice 18) instead of the lower print head portion. In this embodiment the electrode 32' can have a slightly longer length along the drop path to also effect drop deflection as described in U.S. Pat. No. 4,636,808.

The invention has been described in detail with particular reference to preferred embodiments thereof, but it will be understood that variations and modifications can be effected within the spirit and scope of the invention. For example, the stimulation amplitude test ramping could be from the high to low instead of low to high amplitude.

We claim:

1. In ink jet printing apparatus of the kind having orifice means for forming ink jet filaments directed toward a print zone and stimulation means for imposing energy pulses of predetermined frequency to effect drop stream formation from said jet filaments, an improved stimulation control system comprising:

(a) detecting means, including a test charge electrode located downstream from the overdrive inception point of stimulated filaments and an electrometer located to intercept charged drops, for detecting a base stimulation amplitude that produces the minimum-filament-length condition for said jet filaments; and (b) control means, responsive to said detecting means, for adjusting said stimulation means to a nominal operating amplitude that is a predetermined fraction of said detected base stimulation amplitude.

2. The invention defined in claim 1 wherein said detection means further includes:

means for varying said stimulation amplitude gradually upwardly from a condition yielding an underdrive filament of relatively longer length through the overdrive inception point and then into conditions of increasing filament length;

means for storing information signals from said electrometer, indicative of the charge condition of drops charged by said test charge electrode as said stimulation amplitude is so varied; and means for calculating a minimum filament length charge condition from said stored information.

3. The invention defined in claim 2 wherein said printing apparatus comprises discretely addressable, information drop charge electrode located upstream along said filament path from said test charge electrode.

4. The invention defined in claim 1 wherein said test charge electrode is constructed to also provide information charge to ink droplets and said orifice means and said test charge electrode are relatively movable to locate said test charge electrode alternatively in a downstream test charge position or an upstream information charge position.

5. In ink jet printing apparatus of the kind having means, including an orifice plate, for directing a plurality of ink jet filaments toward a print zone and stimulation means for imposing predetermined frequency vibrations to effect drop break off of said jet filaments, an improved stimulation control system comprising: (a) means for varying the amplitude of said stimulation means progressively upwardly from a condition yielding an underdrive filament of relatively longer length through a condition of minimum filament length and then into conditions of increasing filament length;

(b) electrode means located adjacent the filaments and downstream from the region of minimum filament length for imparting test charge to ink drops which break off proximate thereto;

(c) electrometer means located along said droplet path downstream from said electrode means for detecting the charge condition of ink drops as said stimulation amplitude is varied; and (d) means for storing the drop charge conditions detected by said electrometer means and for calculating the minimum filament length stimulation amplitude condition from stored charge conditions.

6. In ink jet printing apparatus of the kind having orifice means for directing a plurality of ink jet filaments toward a print zone and stimulation means for imposing predetermined frequency vibrations to effect drop break off of said jet filaments, an improved stimulation control system comprising:

(a) information charge electrode means located adjacent the filament nominal break off location for selectively charging ink drops in accord with print data;

(b) test charge electrode means located adjacent the filaments and downstream from said information charge electrode means for imparting test charge to ink drops which break off proximate thereto;

(c) means for varying the amplitude of said stimulation means progressively between conditions yielding underdrive filaments and overdrive filaments;

(d) electrometer means located along said droplet path downstream from said electrode means for detecting the charge condition of ink drops as said stimulation amplitude is varied; and (e) means for storing the drop charge conditions detected by said electrometer means and for calculating a minimum filament length charge condition from stored charge conditions.

7. The invention defined in claim 6 further comprising control means for applying a deflection voltage to said test charge electrode means.

8. The invention defined in claim 7 wherein said control means adjusts said apparatus between a test mode wherein said information electrode means is unenergized and said test charge electrode means effects test charging and a print mode wherein said information charge electrode means supplied print data charging and said test charge electrode means is energized with a deflection field voltage higher than said test charge voltage.

* * * * *